(12) United States Patent
Eickhoff et al.

(10) Patent No.: US 10,199,670 B2
(45) Date of Patent: Feb. 5, 2019

(54) POWER GENERATOR HAVING REFERENCE PRESSURE CHAMBER

(71) Applicant: Honeywell International Inc., Morris Plains, NJ (US)

(72) Inventors: Steven J. Eickhoff, Brooklyn Park, MN (US); Russell Barton, New Westminister (CA)

(73) Assignee: Intelligent Energy Limited, Loughborough (GB)

( * ) Notice: Subject to any disclaimer, the term of this patent is extended or adjusted under 35 U.S.C. 154(b) by 171 days.

(21) Appl. No.: 15/093,766

(22) Filed: Apr. 8, 2016

(65) Prior Publication Data

US 2017/0294668 A1   Oct. 12, 2017

(51) Int. Cl.
*H01M 8/06* (2016.01)
*H01M 8/065* (2016.01)
*B01J 7/02* (2006.01)
*C01B 3/06* (2006.01)
*H01M 8/04082* (2016.01)
(Continued)

(52) U.S. Cl.
CPC ............. *H01M 8/065* (2013.01); *B01J 7/02* (2013.01); *C01B 3/065* (2013.01); *H01M 8/04208* (2013.01); *H01M 8/2418* (2016.02); *H01M 2008/1095* (2013.01)

(58) Field of Classification Search
None
See application file for complete search history.

(56) References Cited

U.S. PATENT DOCUMENTS

| 7,892,690 B2 | 2/2011 | Kaye et al. |
| 8,387,441 B2 | 3/2013 | Falta et al. |

(Continued)

FOREIGN PATENT DOCUMENTS

| CN | 107275659 | 10/2017 |
| WO | 0152179 | 7/2001 |

(Continued)

OTHER PUBLICATIONS

Ingimundarson, Ari, et al., "Model-Based Detection of Hydrogen Leaks in a Fuel Cell Stack", *IEEE Transactions on Control Systems Technology*, 16(5), (Sep. 2018), 1004-1012.

(Continued)

*Primary Examiner* — Wyatt P McConnell
(74) *Attorney, Agent, or Firm* — Baker & Hostetler LLP

(57) ABSTRACT

A device includes a case having a surface with a perforation and a first cavity containing a gas generating fuel. A first membrane is supported by the case inside the first cavity. The first membrane has an impermeable valve plate positioned proximate the perforation. The first membrane is water vapor permeable and gas impermeable and flexes responsive to a difference in pressure between the cavity and outside the cavity to selectively allow water vapor to pass through the perforation to the fuel as a function of the difference in pressure. A second membrane that is water vapor permeable gas impermeable is coupled between an outside of the case exposed to ambient atmospheric gas and the valve plate creating a reference pressure second cavity configured to reduce the effects of ambient pressure transients on the difference in pressure. A fuel cell membrane may be included in the device to produce electricity.

20 Claims, 14 Drawing Sheets

(51) Int. Cl.
    *H01M 8/1018*    (2016.01)
    *H01M 8/2418*    (2016.01)

(56)    References Cited

U.S. PATENT DOCUMENTS 8,778,551 B2       7/2014   Chapman et al.
    9,105,888 B2       8/2015   Falta et al.
    2005/0285742 A1   12/2005   Charych et al.
    2012/0094196 A1*   4/2012   Eickhoff ................ H01M 8/06
                                                            429/414
    2015/0032676 A1*   1/2015   Smith et al. ............ H01M 8/06

FOREIGN PATENT DOCUMENTS

WO       2007011863       1/2007
    WO       2009064926       5/2009

OTHER PUBLICATIONS

Karnik, Amey Y., et al., "Control Analysis of an Ejector Based Fuel Cell Anode Recirculation System", *Proceedings of the 2006 American Control Conference*, Minneapolis, MN, Jun. 14-16, 2006, (2006), 484-489.

Klumbies, Hannes, et al., "Actuators tobe Integrated in Low Temperature Cofired Ceramics (LTCC) Microfluidic Systems" *2009 32nd International Spring Seminar on Electronics Technology*, May 13-17, 2009, (2009), 1-4.

"European Application Serial No. 17165500.4, Extended European Search Report dated Aug. 4, 2017", 11 pgs.

"U.S. Appl. No. 15/093,766, Response filed Apr. 16, 2018 to Non Final Office Action dated Mar. 8, 2018", 8 pgs.

\* cited by examiner

POWER GENERATOR HAVING REFERENCE PRESSURE CHAMBER

BACKGROUND

Some hydrogen generators generate hydrogen by reacting water vapor with a hydride fuel. The water vapor has been provided by different sources, such as ambient, a reservoir of water, or even as a byproduct of a chemical reaction such as in the case of fuel cells. When hydrogen is not required from the hydrogen generator, the supply of water vapor is shut off. The shut off has been accomplished by somewhat complex arrangements of valves.

Some arrangements of valves may be adversely affected by changes in ambient pressure, which may close a valve prematurely, resulting in a lack of water vapor where no reservoir is present. Such a change in ambient pressure may be caused by changes in elevation due to ascent on a passenger aircraft. Without a supply of water vapor, existing generated hydrogen may be consumed by a fuel cell, resulting in complete shutdown of the hydrogen generator and power generator incorporating the hydrogen generator and fuel cell until ambient pressure approaches its previous value.

SUMMARY

A device includes a case having a surface with a perforation and a first cavity containing a gas generating fuel. A first membrane is supported by the case inside the first cavity. The first membrane has an impermeable valve plate positioned proximate the perforation. The first membrane is water vapor permeable and gas impermeable and flexes responsive to a difference in pressure between the cavity and outside the cavity to selectively allow water vapor to pass through the perforation to the fuel as a function of the difference in pressure. A second membrane that is water vapor permeable gas impermeable is coupled between an outside of the case exposed to ambient atmospheric gas and the valve plate creating a reference pressure second cavity configured to reduce the effects of ambient pressure transients on the difference in pressure.

A power generator includes a case having a surface with an array of perforations and a first cavity containing a gas generating fuel. A first membrane is supported at a first side of the case inside the first cavity, the first membrane having an array of impermeable valve plates, each positioned proximate the perforations, wherein the first membrane is water vapor permeable and gas impermeable and flexes responsive to a difference in pressure between the cavity and outside the first cavity to selectively allow water vapor to pass through the perforations to the fuel as a function of the difference in pressure. A fuel cell membrane is supported to receive hydrogen at an anode side of the fuel cell membrane and to receive oxygen from outside the power generator at a cathode side of the fuel cell membrane. A second membrane that is water vapor permeable and gas impermeable is disposed between ambient air and the first membrane. The second membrane includes a ridged layer to create a second cavity having a reference pressure on a side of the first membrane opposite the first cavity.

A method includes passing water vapor through a gas impermeable, water vapor permeable first membrane to a gas producing fuel in a power generator, maintaining a reference pressure in a reference pressure chamber, responsive to a gas pressure in the container higher than pressure outside the power generator, moving a plate supported by the first membrane towards a perforation in the reference pressure chamber to impede passing of water vapor to the gas producing fuel, responsive to a gas pressure in the power generator lower than the pressure in the reference pressure chamber, moving the first membrane and plate away from the perforation, providing gas produced by the gas producing fuel reacting with the water vapor to a fuel cell membrane, and providing oxygen to the fuel cell membrane to produce electricity.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
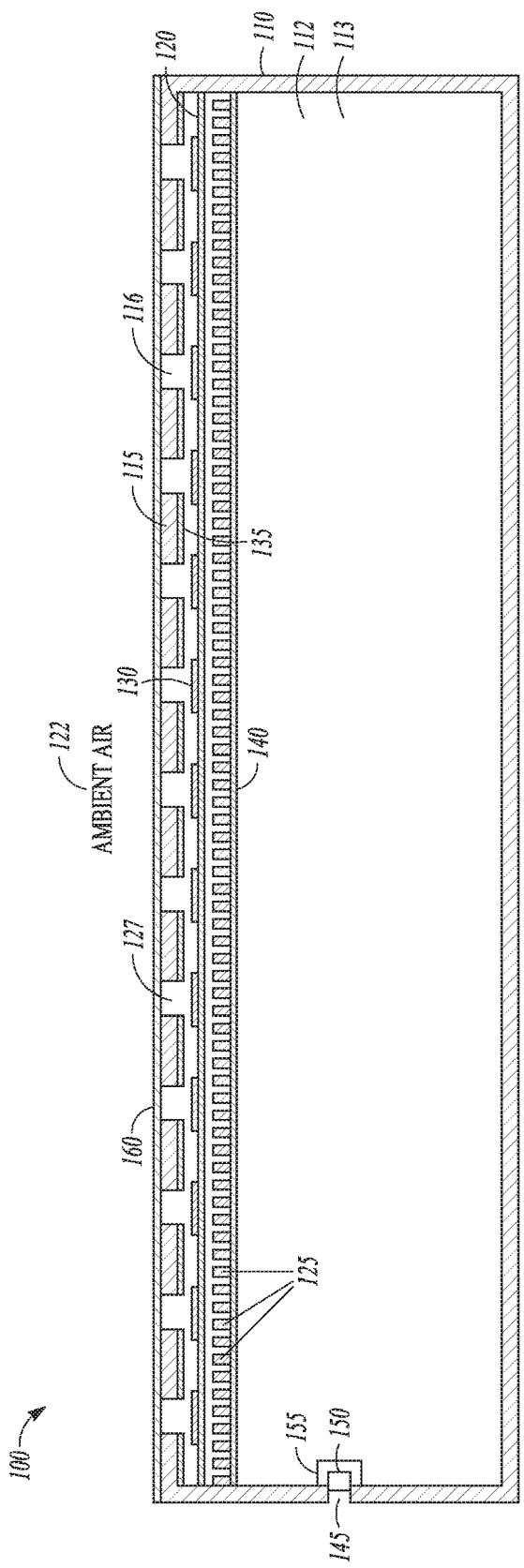
FIG. 1 is a block diagram cross section representation of a fuel cartridge having a membrane based valve assembly and reference pressure chamber according to an example embodiment.

FIG. 1 is a cross sectional representation of a removable fuel cartridge 100. Cartridge 100 comprises a case 110 (metal or polymer) containing a water-reactive gas generating fuel 112 in a first cavity 113. The cartridge 100 may be inserted into a gas consuming device, such as a power generator. In one embodiment the power generator comprises a fuel cell system and the generated gas comprises hydrogen. A side or face 115 of the case 110 is may be perforated as indicated at openings 116, and exposes a selectively permeable first membrane 120 (water vapor permeable, atmospheric gas impermeable) which separates the fuel 112 from the ambient environment 122 outside the case 110. The ambient environment 122 may be any environment in which the cartridge 100 resides, such as indoor air, outdoor air, including air inside a device in which the cartridge 100 is disposed.

In one embodiment, the first membrane 120 is positioned between the perforated face 115 and a permeable plate 125, which may be perforated in one embodiment, forming a second cavity 127. The first membrane 120 is flexible, and moves between the plate 125 and face 115 responsive to a difference in pressure between the cavity 113 and a reference pressure in second cavity 127. The plate 125 and face 115 bound the movement of the first membrane 120 in one embodiment such that the membrane is not unduly stressed via the difference in pressure that may develop. A typical gap may be up to a few hundred microns in some embodiments and more in others, depending on the lateral dimensions of the first membrane 120. The first membrane 120 may be coupled to sides of the case 110 via adhesive on a perimeter of the first membrane 120 or other method to provide a seal that allows the difference in pressure to cause the first membrane 120 to move transverse to the face 115.

In one embodiment, the first membrane 120 comprises one or more valve plates 130 that move toward the perforations 116 when the pressure is higher inside the cavity 113, and move away from the perforations when the pressure inside the cavity is lower than ambient 122. In one embodiment, a gasket 135 is formed about the perforations which is compressible to form a seal with corresponding valve plates 130 when the difference in pressure causes the first membrane 120 to push the valve plates 130 into contact with the gasket. The gasket may be optional where the materials comprising the valve plates 130 and face 115 having perforations 116 form an adequate seal when pressed against each other by the different in pressure. The differences in pressure in some embodiments modulate up to few tenths of a pound per square inch in one embodiment.

In various embodiments, the number of perforations 116 in face 115 may vary between one and many, forming an array of perforations. Similarly, the number of valve plates may be the same as the number of perforations, and arranged in an array to mate with each corresponding perforation. In still further embodiments, one or more larger valve plates may be used such that each valve plate may cover multiple perforations.

In one embodiment, a gas permeable particulate filter 140 is positioned between fuel 112 and plate 125 to prevent fuel from clogging the perforations in the plate 125. The fuel in various embodiments may be porous to allow the water vapor passing through the perforated face 115, first membrane 120 in areas other than those contain the valve plates 130, plate 125, and filter 140 to migrate through the fuel to generate more gas. The fuel porosity in one embodiment varies between approximately 15% and 20%. The porosity may be selected to allow adequate movement of gas and water vapor while at the same time providing a desired gas producing capability.

The gas also moves through the porous fuel 112 towards a gas exit 145. The gas exit in different embodiments may be positioned on a side of the case 110 that may be plugged into a gas consuming device. While the gas exit 145 is shown about a middle of the side of the case 115, it may be located in any convenient location on the case where the gas may be used. A check valve 150 may be coupled to the gas exit and be actuated by plugging the fuel container 100 into the gas consuming device. In still a further embodiment, a particulate filter 155 may be positioned about the check valve 150 and gas exit 145 to prevent the gas exit 145 from being clogged by fuel. Channels may be formed within cavity 113 to facilitate distribution of water vapor and generated gas in still further embodiments.

In one embodiment, a second membrane 160 may be positioned between the plate 125 and ambient 122, further enclosing second reference cavity 127. The second membrane 160 may be formed of a sulfonated tetrafluoroethylene based fluoropolymer-copolymer layer such as Nafion® or PRIMEA®, that is between approximately 25 um to 50 um thick, and may be supported by a perforated rigid layer. The second membrane 160 is water vapor permeable and gas impermeable such that a reference pressure is maintained at a fairly constant pressure in cavity 127, even when ambient air 122 pressure changes, such as due to altitude and general barometric pressure changes, which may be referred to as pressure transients. The perforated rigid layer, which may be formed of a rigid material such as plastic, ceramic, metal or the like, has a sufficient percentage of openings to allow water vapor to enter the container 110 and be provided to the fuel 112 to generate hydrogen as needed. In one embodiment, the second membrane is rigid enough such that the reference pressure in second chamber 127 does not change enough to allow the valve plates 130 to engage the perforations 116 responsive to ambient pressure transients.

In various embodiments, the second membrane 160 may be adhered to the plate 125 via adhesive or other means for securing the second membrane 160 to the container 110, such as clamps. The perforated rigid layer of second membrane 160 may be disposed adjacent the plate 115 with the Nafion layer disposed between the rigid layer and ambient in one embodiment. In further embodiment, the Nafion layer may be sandwiched between two perforated rigid layers to retain the Nafion layer in a substantially fixed position despite increases or decreases in ambient pressure.

Figure 2:
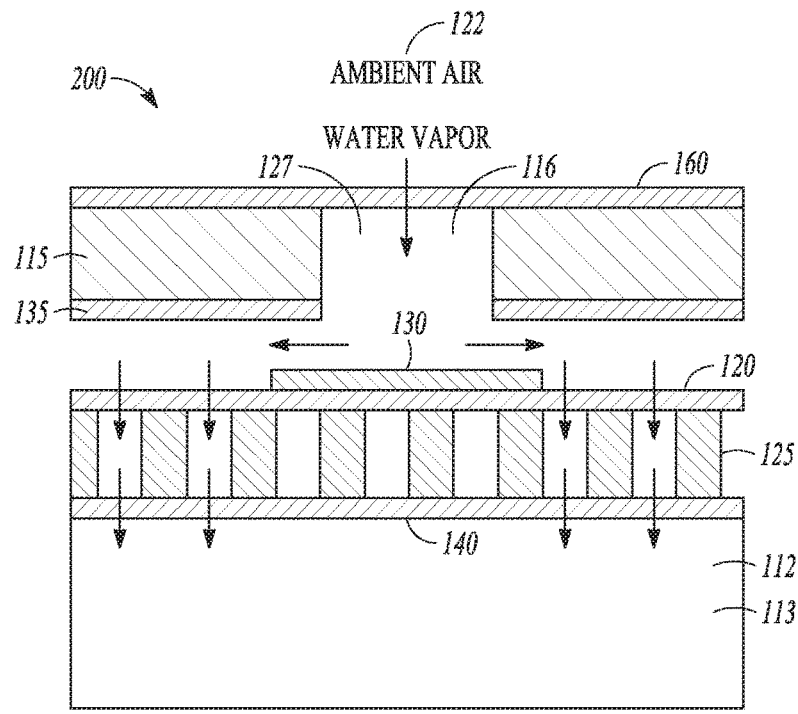
FIG. 2 is a block diagram cross section representation of a portion of the fuel cartridge of FIG. 1 showing the valve in an open position according to an example embodiment.
Figure 3:
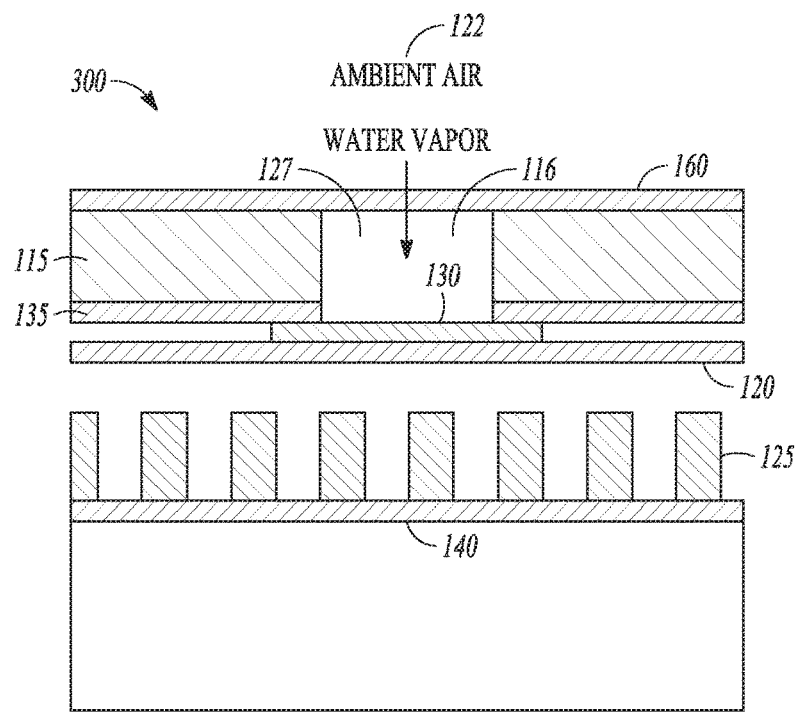
FIG. 3 is a block diagram cross section representation of a portion of the fuel cartridge of FIG. 1 showing the valve in a closed position according to an example embodiment.

FIGS. 2 and 3 are partial cross sections illustrating the interaction of the valve plates 130 with the perforated plate 115. At 200 in FIG. 2, when a low pressure occurs in first chamber 113 due to gas being drawn out of the chamber for use, the resulting difference in pressure between first chamber 113 and second chamber 127 results in the first membrane 120 being flexed toward the plate 125, allowing water vapor to enter through perforations 116, and pass through the first membrane 120 at portions of the membrane not being covered by valve plates 130.

FIG. 3 illustrates the interaction of the valve plates 130 with the perforated plate 115 when the pressure inside the first chamber 113 is greater than ambient 122 pressure. The first membrane 120 is shown as being pushed toward the perforated plate 115, causing the valve plates 130 to come into contact with the perforated plate 115, optionally via the gasket 135. Note that the second membrane 127 has not visibly moved, keeping the reference pressure in second chamber 127 substantially unaffected by ambient atmospheric gas pressure transients. Pressure variations within second chamber 127 may occur responsive to movement of the first membrane 120, as such movement may affect the overall volume of the second chamber 127. Minimizing the range of motion of the first membrane 120 may reduce such pressure variations.

In one embodiment, the valve plates 130 are sized to be a little bit larger than the perforations 116 such that they serve to block flow of water vapor when contacting the perforations 116. When generated gas is drawn out via gas exit 145, the pressure decreases, allowing the valve plates 130 to move away from the perforations 116 and once again allow water vapor to reach the fuel 112 through first membrane 120 via the second membrane 160. The flexible first membrane 120 with valve plates 130 thus serves to regulate the water vapor flow and hence gas generation response to the difference in pressure.

In one embodiment, the water vapor reacts with the fuel 112 to generate hydrogen. The hydrogen is provided via gas exit 145 when the cartridge 100 is inserted into a fuel cell based power generator. The power generator may also cause the check valve 150 to be opened when the cartridge is inserted, allowing the hydrogen to exit.

Figure 4:
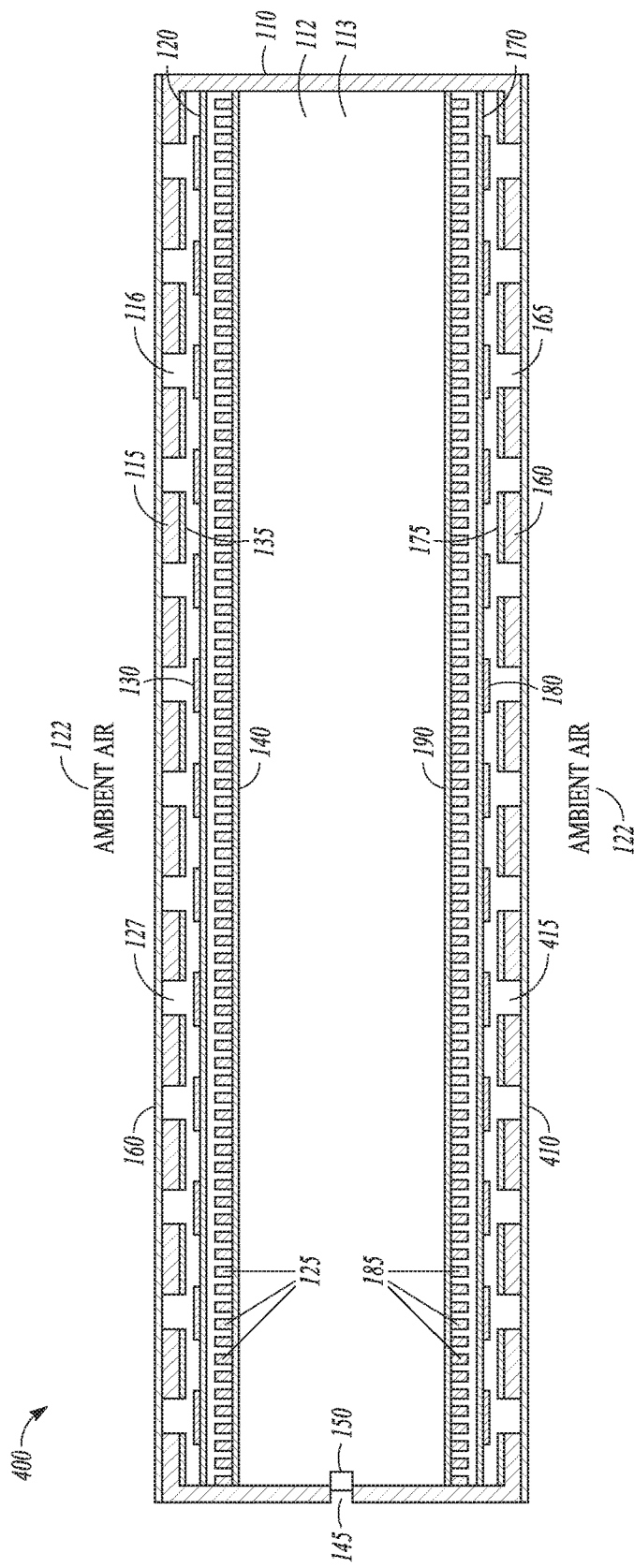
FIG. 4 is a block diagram cross section representation of an alternative fuel cartridge having a membrane based valve assembly and reference pressure chamber according to an example embodiment.

FIG. 4 is a cross section of an alternative gas generating cartridge 400. Cartridge 400 also contains a water vapor membrane based valve arrangement as shown in FIG. 1 which is numbered consistently with FIG. 1. In addition, a second water vapor membrane based valve arrangement is illustrated on a further side of the cartridge 400. A side or face 160 is perforated as indicated at 165. Similarly to face 115, a gasket 175 may also be used, a membrane 170, similar to membrane 120, may be positioned with valve plates 180 between the face 160 and a perforated plate 185. A particulate filter 190 may also be positioned between the fuel 112 and the perforated plate 185. Each of these elements operates similarly to the valve assembly shown on the other or opposite side of the case 110. A membrane 410 similar to membrane 160 may be positioned to help maintain a reference pressure in a chamber 415, operating similarly to chamber 127. In one embodiment the reference pressures in chamber 127 and 415 are equal, resulting in both membrane/valve assemblies operating in unison responsive to changes in pressure in the fuel chamber 113 with respect to such reference pressures. In further embodiments, more than two such membrane/valve, and reference pressure chamber assemblies may be utilized.

Figure 5A:
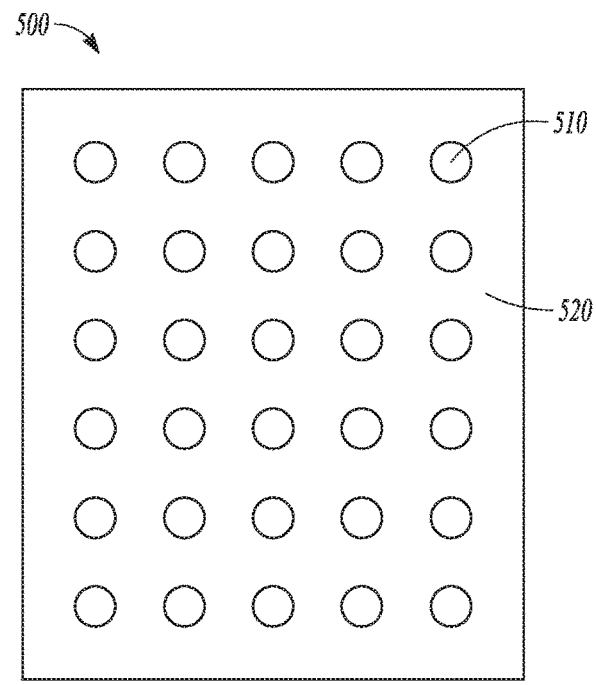
FIG. 5A is a top view representation of a first membrane having an array of valve plates according to an example embodiment.

FIG. 5A is a top view of a first membrane 500 representation. The membrane 500 in one embodiment supports an array of water and gas impermeable valve plates 510. The membrane 500 may be formed of Dupont Nation® material or Gore® PRIMEA® membrane material that is metalized to form the plates 510. The valve plates may be formed of metal, such as aluminum, and may be patterned by deposition or otherwise formed on the membrane 500 in a position such that they will mate with the perforations in the perforated plate to form the water vapor valve assembly. Other materials, such as a polymer or plastic that is impermeable to gas may be used in further embodiments, and may be deposited, glued, or otherwise supported in position on the membrane 500.

Membrane 500 in one embodiment, where not covered by valve plates as indicated at 520 is water vapor permeable and gas impermeable. Ionomer type membranes may be used in some embodiments. Example membrane materials include Nafion or PRIMEA membranes.

Figure 5B:
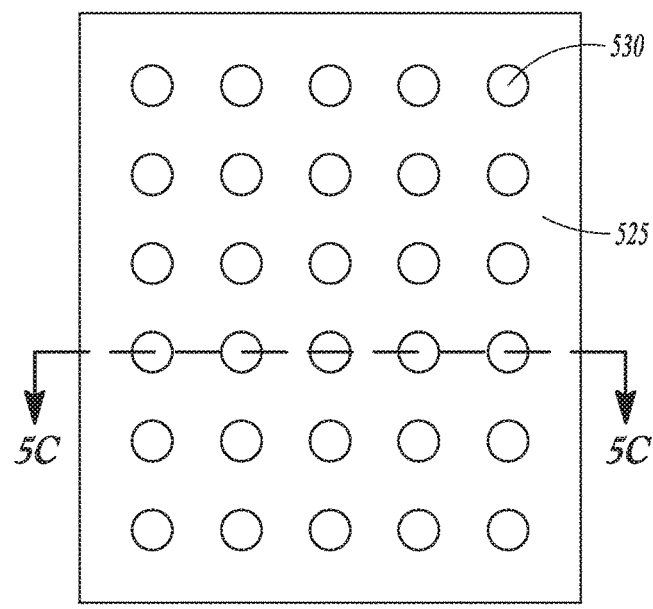
FIG. 5B is bottom view of a second membrane showing a rigid layer with an opening through which water vapor may pass according to an example embodiment.

FIG. 5B is bottom view of the second membrane 160 showing the rigid layer at 525, with element 530 being an opening in the rigid layer 160 through which water vapor may pass. While the second membrane 160 rigid layer may have the same shape and layout as membrane 500, the openings 530 may be smaller than the valve plates 510 and corresponding perforations 116 to provide additional rigidity to help keep the reference pressure from changing responsive to ambient pressure transients, provided the openings allow enough water vapor to pass and enable the fuel 112 to provide sufficient hydrogen to a power generator. The rigid layer may also a comprise a continuous porous metal or ceramic material that is gas permeable but resists bending due to changes in ambient pressure.

Figure 5C:
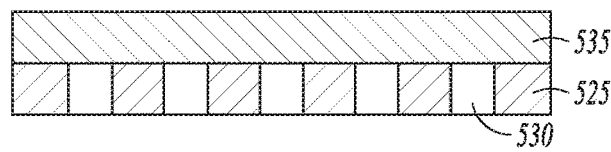
FIG. 5C is a side cross section view of the second membrane taken along line 5C-5C in FIG. 5B according to an example embodiment.

FIG. 5C is a side cross section view taken along line 5C-5C in FIG. 5B. The rigid layer 525 is show with the openings 530 illustrated as traversing the entire rigid layer 525 cross section. The water vapor permeable, air impermeable layer of the second membrane is illustrated at 535 and is a continuous layer across the entire rigid layer 525 to maintain the reference pressure in chamber 127. The rigid layer 525 may be coupled to the plate 115, such as at a periphery of the plate 115 via adhesive or other means. The adhesive may also adhere the rigid layer 525 to the plate 115 at areas not including the perforations as indicated at 520 in FIG. 5A.

Figure 5D:
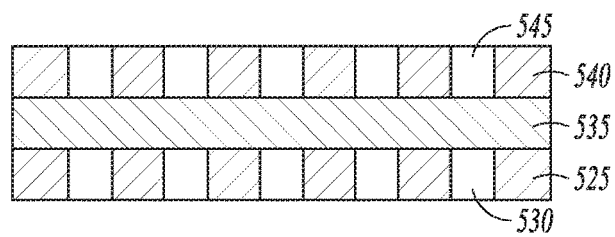
FIG. 5D is a side cross section view of an alternative second membrane having an additional rigid layer with openings to allow water vapor to pass according to an example embodiment.

FIG. 5D is a side cross section view of an alternative second membrane having an additional rigid layer 540 with openings 545 which may be aligned with openings 530 to allow water vapor to pass. The additional rigid layer 540 may help retain the layer 535 from bowing toward ambient 122 when the reference pressure is greater than ambient pressure, as layer 535 and from becoming detached from the rigid layer 525.

Figure 6:
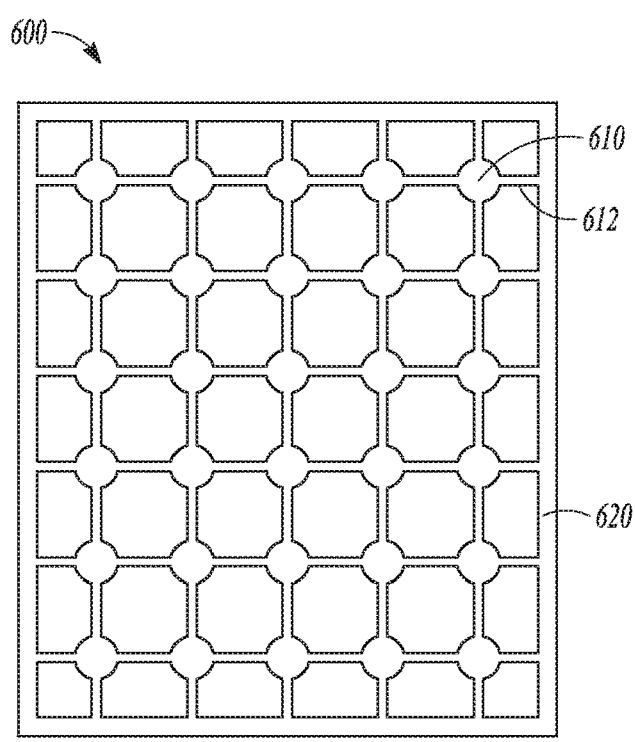
FIG. 6 is a top view representation of a membrane having an array of interconnected valve plates according to an example embodiment.

FIG. 6 is a top view of a first membrane (120) 600 representation. The membrane 600 in one embodiment supports an array of gas impermeable valve plates 610 that maybe interconnected by connectors 612 to provide additional structural integrity to the membrane as it flexes responsive to the difference in pressure. A perimeter band 620 may also be formed to provide additional structural integrity where the membrane 600 is attached to the case of the cartridge. The valve plates, connectors, and band may be formed of metal, such as aluminum, and may be patterned by deposition or otherwise formed on the membrane 600 in a position such that they will mate with the perforations in the perforated plate to form the water vapor valve assembly. Other materials, such as a polymer or plastic such as Kapton that is impermeable to gas may be used in further embodiments, and may be deposited, glued, or otherwise supported in position on the membrane 600. Each of the elements may be formed of different materials in further embodiments.

Membrane 600 in one embodiment, where not covered by valve plates as indicated at 615 is water vapor permeable and gas impermeable. Ionomer type membranes may be used in some embodiments. Example membrane materials include Nafion or PRIMEA membranes.

Figure 7:
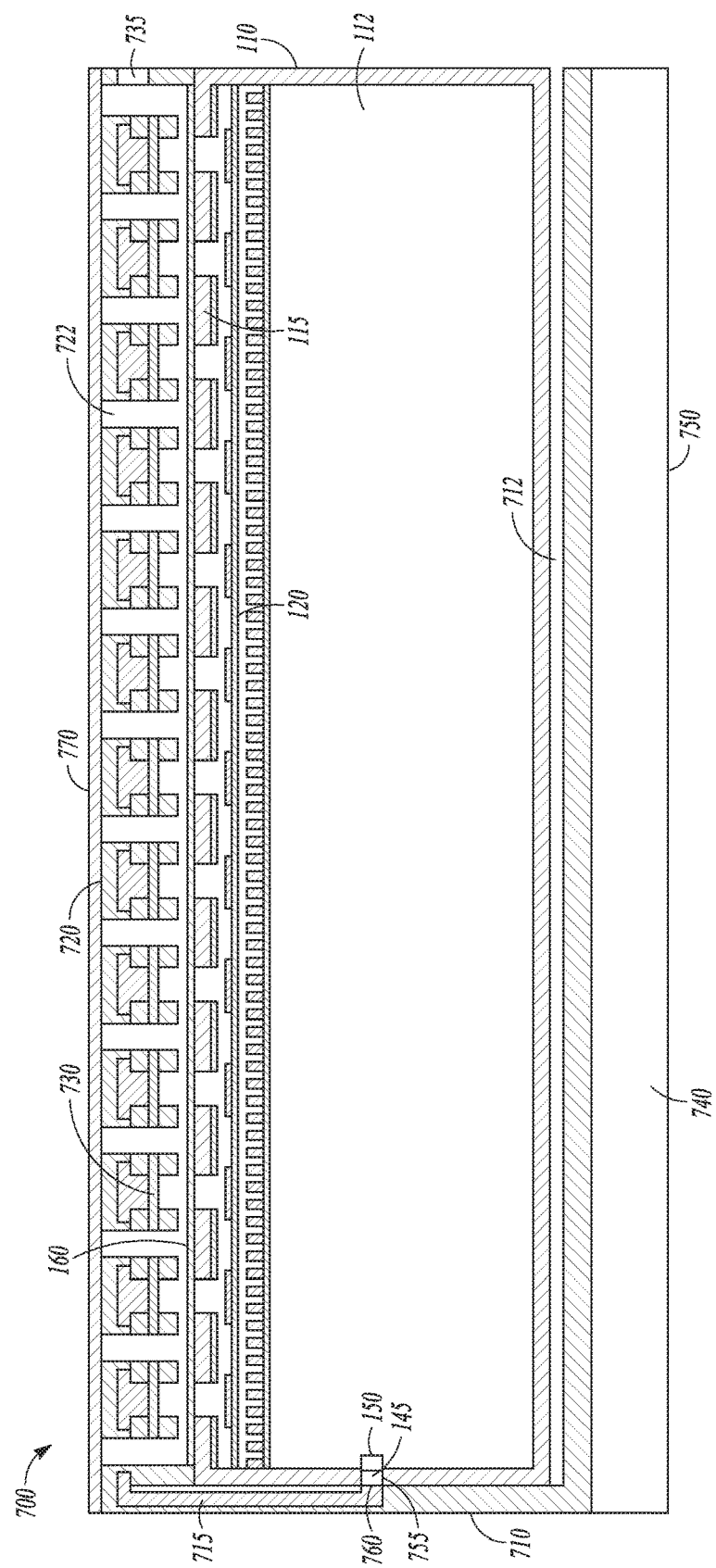
FIG. 7 is a cross section representation of a power generator utilizing a gas generating cartridge having a membrane based valve assembly and reference pressure chamber according to an example embodiment.
Figure 8:
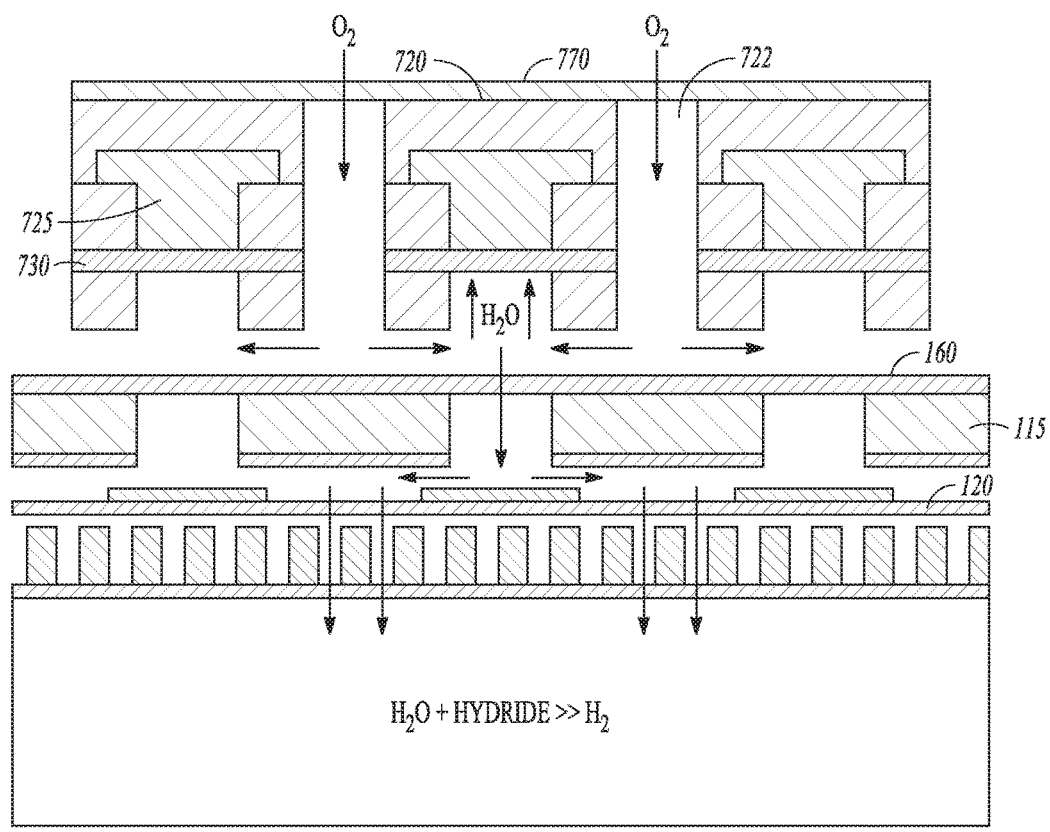
FIG. 8 is a portion of the power generator of FIG. 7.

FIG. 7 is a cross section representation of a device 700 to utilize a gas generating cartridge case 110. FIG. 8 is a blown up view of a portion of the device 700 and has reference numbers consistent with those used in FIG. 7. In one embodiment, device 700 includes a case 710 having a cavity 712 into which the cartridge 100 may be inserted. Case 710 may be formed of the same material as the cartridge case 110 in some embodiments, or other material suitably ridged. A gas channel or transport path 715 formed in the case 710 may extend from the gas exit 145 of case 110 and provide generated gas to a manifold 720 having multiple openings 722 to allow water vapor to reach case 110 and the gas generating fuel 112.

In one embodiment, manifold 720 forms a structural wall of the case 710, and also includes an array of channels 725 to provide gas to a membrane 730, such as a fuel cell membrane electrode assembly. In one embodiment, the gas is hydrogen, which is provided to an anode side of the membrane 730. The manifold sandwiches the membrane 730 to prevent hydrogen from leaking around the membrane, and also exposes a cathode side of the membrane to oxygen from ambient via openings 722. Electricity is produced by the membrane along with water vapor which migrates toward the cartridge case 110 along with ambient water vapor to reach the fuel 112 and produce more hydrogen, as regulated by the membrane valve assembly in case 110 based on the difference in pressure. The electricity generated may be provided to an external device, or a device in which the device 700 is integrated into in further embodiments.

Case 110 also includes the second membrane 160, forming the reference pressure chamber 127. Second membrane 160 may be disposed between the plate 115 and the fuel cell assembly such that water vapor generated by the membrane 730 may pass through the second membrane 160 and the first membrane 120 to reach the fuel 112.

Management electronics 740 may be disposed anywhere in the device 700, and is shown supported by a bottom plate 750 of device 700, which may be a power generator in some embodiments. In one embodiment, management electronics 740 is a controller, such as a micro-controller that may be adapted to manage power generation and delivery, including a rechargeable battery, battery charging integrated circuit, etc. Electronics 740 may be separable, and alternatively, its functions may be provided by device such as a mobile device like a smart phone or touchpad for example.

Figure 9:
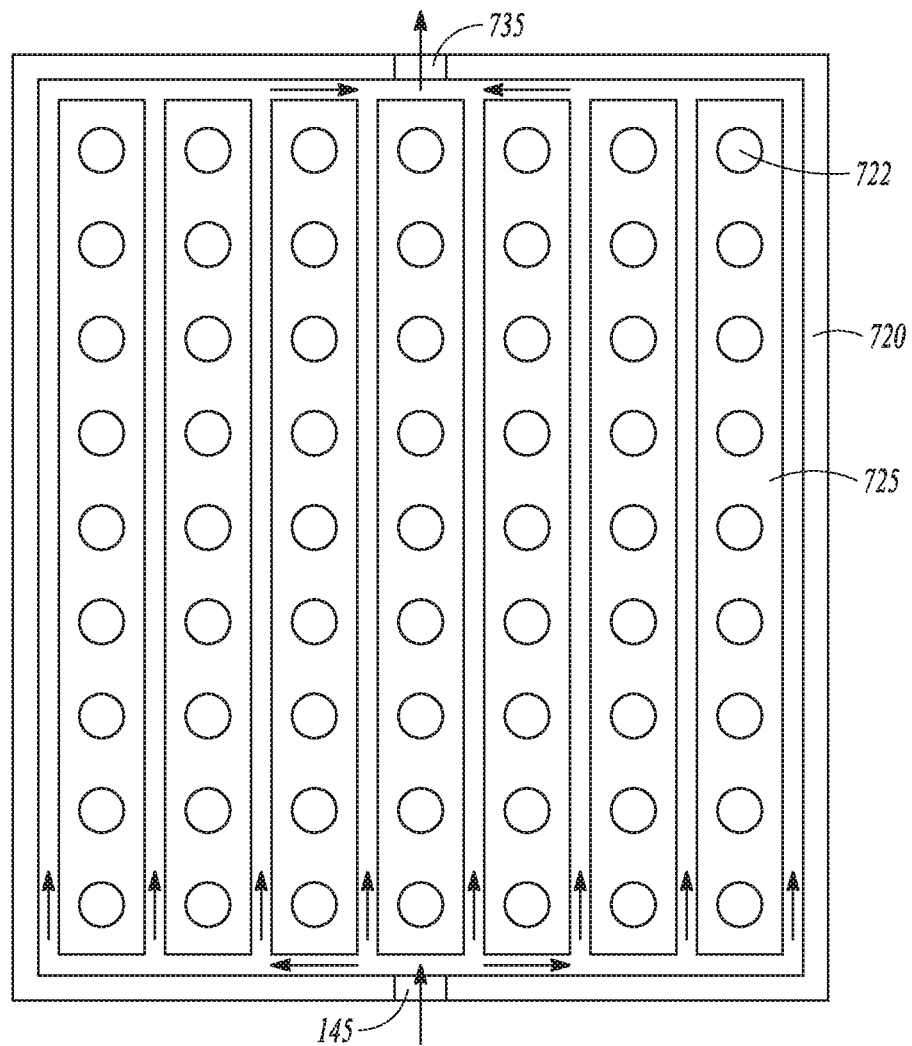
FIG. 9 is a top view block representation of a manifold for the power generator of FIGS. 7 and 8 according to an example embodiment.

The manifold 720 in one embodiment is illustrated in a top view representation in FIG. 9. Openings 722 are shown as round openings in one embodiment, with the channels 725 running between the openings 722 and containing fuel cell membranes 730 which may run the length of the channels 725 in one embodiment. Manifold 720 further includes an exhaust valve 735 which vents gas to ambient. The exhaust valve 735 may be solenoid controlled in one embodiment and may be used to exhaust nitrogen and other gases that may build up during operation. Exhaust valve 735 may also be actuated as a function of pressure, temperature or other sensed parameter or parameters in further embodiments. Also shown is check valve 150 from the case 110.

The device 700 in one embodiment contains a check-valve and fuel cartridge interface 755 which automatically opens the check valve 150 when the cartridge case 110 is inserted into the device cavity 712, allowing hydrogen to flow from the cartridge case 110 to the fuel cells 730. In some embodiments, multiple valves may be provided on the cartridge case 110 with the device 700 having multiple interfaces 755.

Device 700 in one embodiment is a fuel cell based power generator that utilizes hydrogen produced from a water reactive hydrogen generating fuel such as a hydride fuel. Production of hydrogen increases pressure in the case 110 while drawing hydrogen from the case reduces the pressure. When power is not drawn from the fuel cells, hydrogen is not drawn from the case 110 and the pressure inside the case increases as water vapor remaining in the case is used to create more hydrogen. The increased pressure pushes the membrane supported valve plates into a closed position with respect to the perforations, shutting off the supply of water vapor and leading to a decrease or cessation of hydrogen production. When power demands increase, the pressure is reduced, resulting in more water vapor being provided to the fuel 112 and the production of more hydrogen to provide to the fuel cells. An equilibrium pressure may be established dependent on the electrical load and ambient temperature and humidity.

In one embodiment, the manifold 720 is generally planar in shape and may consist of multiple cells connected in series. The power management electronics 740 may include a rechargeable battery, such as a Li-ion battery manufactured by Saft America Inc. The battery may be used to power the electronics and may also provide additional power during periods of high demand or transient fluctuations in power demand. The battery may be recharged utilizing electricity generated by the fuel cell. Other rechargeable or non-rechargeable batteries may be used in further embodiments. One or more sensors 760 may be included at various portions of the device 700 and coupled to the electronics 740 to provide temperature and/or pressure information for use in controlling various features, such as exhaust valve 735. A single sensor 760 is shown in block form in transport path 715 as an example of the one or more sensors. In further embodiments, the number and placement of sensors may vary as desired. In some embodiments the sensor 760 includes a least one of a temperature sensor pressure sensor, humidity sensor, and voltage sensor The fuel 112 may be formed of many different hydrides such as combinations of chemical hydrides, and combinations of chemical hydrides and metal hydrides may be used for the hydrogen producing fuel, such as for example alane $AlH_3$, $LiAlH_4$, $NaAlH_4$, $KAlH_4$, $MgAlH_4$, $CaH_2$, $LiBH_4$, $NaBH_4$, $LiH$, $MgH_2$, $Li_3Al_2$, $CaAl_2H_8$, $Mg_2Al_3$, alkali metals, alkaline earth metals, alkali metal silicides, or any combinations thereof that act as a water-reactive hydrogen-producing material that reacts with water vapor to produce hydrogen.

In one embodiment, the hydrogen producing fuel may be formed as pellets with a controlled porosity. The term pellet, is used in a broad sense to describe any shape or configuration of the hydride particles that occupy in the space allotted to the chemical hydride in the fuel source. Thus, the shape of the chemical hydride pellet is not critical. It may be a, layer, disk, tablet, sphere, or have no specific shape. The shape of the chemical hydride particles may be determined by the shape of the fuel source and the need to make the most efficient use of the space allotted to the chemical hydride. If appropriate, differently shaped chemical hydride pellets can be used within one fuel source.

The power generator may be formed in the size of a standard "AA", "AAA", "C", or "D" cell (or any other battery size) that can be removed and replaced. In further embodiments, the power generator may be positioned within a device to be powered in a manner that allows access to the fuel container to remove and replace it with a new or recharged fuel container and also allows access to ambient for providing oxygen to the fuel cell. In one embodiment, manifold 720 may be covered with a water resistant membrane 770, such as a Gortex® membrane to prevent damage to the device 700 if it is exposed to liquid water. Membrane 770 is impermeable to liquid water, but permeable to water vapor and other gases. Such a membrane may also be used in other embodiments.

Figure 10:
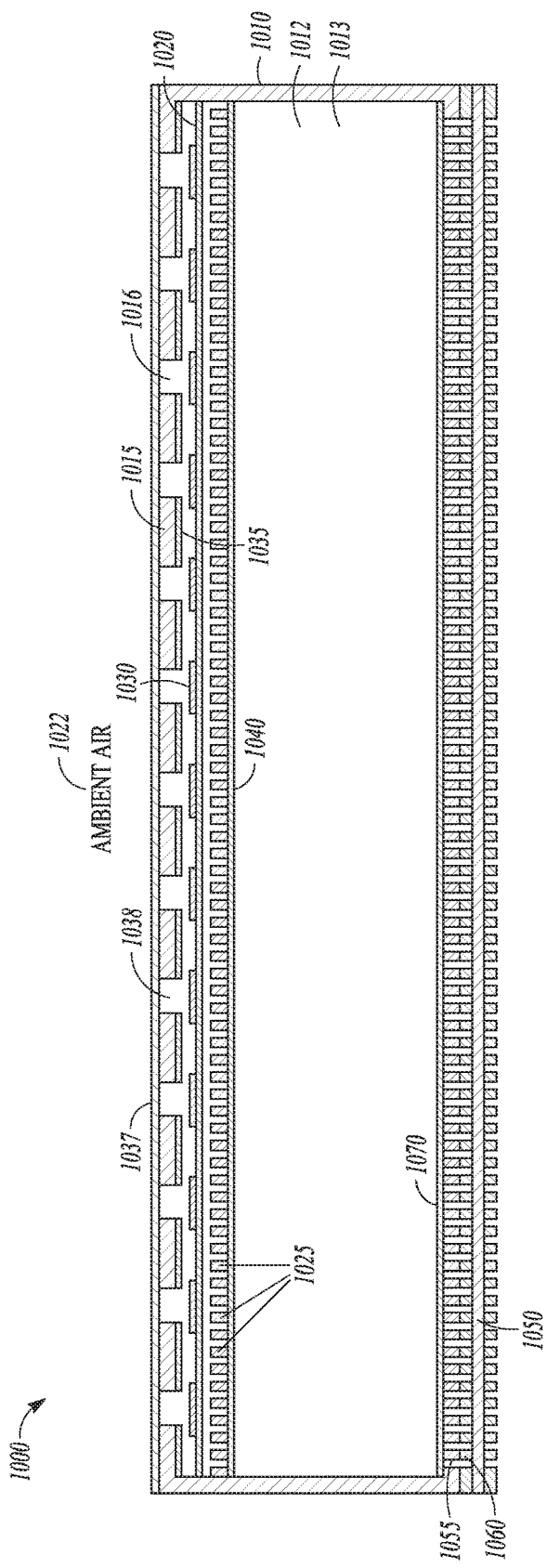
FIG. 10 is a cross section representation of a power generator incorporating a membrane with a valve assembly and reference pressure chamber according to an example embodiment.
Figure 11:
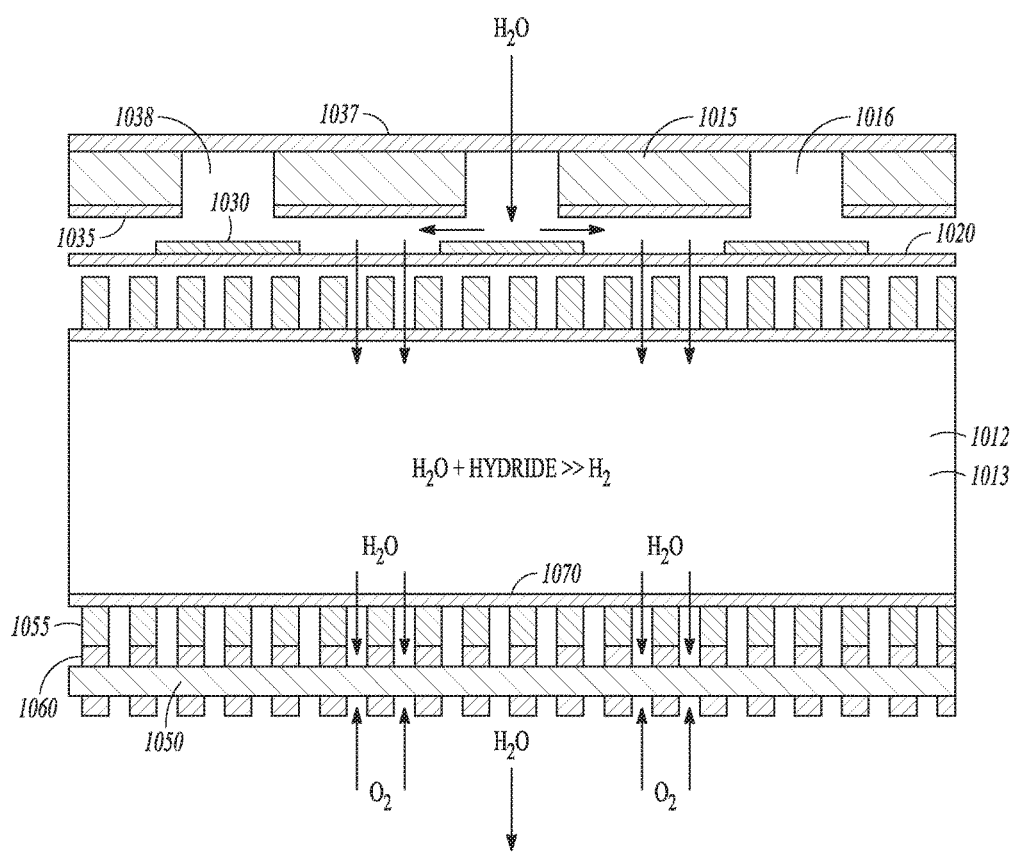
FIG. 11 is a cross section representation of a portion of the power generator of FIG. 10 according to an example embodiment.

FIG. 10 is a block cross section view of a fuel cell based power generator 1000. FIG. 11 is a blown up portion of the generator with numbering consistent with FIG. 10. In one embodiment, the power generator 1000 is formed with a self-modulated fuel container similar to that illustrated in FIG. 1. In one embodiment, generator 1000 comprises a case 1010 (metal or polymer) containing a water-reactive gas generating fuel 1012 in a cavity 1013. A side or face 1015 of the case 1010 is perforated 1016, and exposes a selectively permeable membrane 1020 (water vapor permeable, gas impermeable) which separates the fuel 1012 from the ambient environment 1022 outside the case 1010.

In one embodiment, the membrane 1020 is positioned between the perforated face 1015 and a perforated plate 1025. The membrane 1020 is flexible, and moves between the plate 1025 and face 1015 responsive to a difference in pressure between the cavity 1013 and ambient 1022. The plate 1025 and face 1015 bound the movement of the membrane 1020 in one embodiment such that the membrane is not unduly stressed via the difference in pressure that may develop. The membrane may be coupled to sides of the case 1010 via adhesive on a perimeter of the membrane or other method to provide a seal that allows the difference in pressure to cause the membrane 1020 to move transverse to the face 1015.

In one embodiment, the membrane 1020 comprises one or more valve plates 1030 that move toward the perforations 1016 when the pressure is higher inside the cavity 1013, and move away from the perforations when the pressure inside the cavity is lower than ambient 1022. In one embodiment, a gasket 1035 is formed about the perforations to form a seal with corresponding valve plates 1030 when the difference in pressure causes the membrane to push the valve plates 1030 into contact with the gasket. The gasket may be optional where the materials comprising the valve plates 1030 and face 1015 having perforations 1016 form an adequate seal when pressed against each other by the different in pressure. The differences in pressure in some embodiments modulate up to few tenths of a pound per square inch in one embodiment.

In various embodiments, the number of perforations 1016 in face 1015 may vary between one and many, forming an array of perforations. Similarly, the number of valve plates may be the same as the number of perforations, and arranged in an array to mate with each corresponding perforation. In still further embodiments, one or more larger valve plates may be used such that each valve plate may cover multiple perforations.

A reference pressure maintaining membrane 1037 may be disposed between ambient 1022 and the face 1020 in one embodiment to help maintain a reference pressure in a chamber 1038 between face 1020 and membrane 1020 in a manner the same as that in FIG. 1.

In one embodiment, a gas permeable particulate filter 1040 is positioned between fuel 1012 and plate 1025 to prevent fuel from clogging the perforations in the plate 1025. The fuel in various embodiments may be porous to allow the water vapor passing through the perforated face 1015, membrane 1020 in areas other than those contain the valve plates 1030, plate 1025, and filter 1040 to migrate through the fuel to generate more gas. The fuel porosity in one embodiment varies between approximately 15% and 20%. The porosity may be selected to allow adequate movement of gas and water vapor while at the same time providing a desired gas producing capability.

In one embodiment, a fuel cell proton exchange membrane (PEM) 1050 is supported by a further face 1060 of the power generator 1000. Face 1060 has perforations or holes that allow the hydrogen to migrate to the fuel cell 1050. The fuel cell 1050 receives hydrogen generated by fuel 1012 at an anode side facing the fuel 1012, generates electricity, and exhausts water vapor resulting from the reaction to ambient. A cathode side of the fuel cell 1050 is facing ambient and receive oxygen from ambient.

In one embodiment, the fuel cell 1050 is sandwiched between rigid plates 1060 that have holes to allow oxygen and water vapor to pass to and from the fuel cell. The holes may or may not line up with the face 1055 perforations. A particulate filter 1070 may also be provided between the face 1055 and the fuel 1012 to prevent clogging of the perforations by loose fuel. The fuel cell membrane may be sealed at the sides of the case to prevent ambient water vapor from reaching the fuel from the fuel cell side of the power generator.

Power generator 1000 in one embodiment integrates the membrane valve, fuel cartridge and fuel cell into one monolithic unit. In such a unit, there is no need for gas seals or muting channels to couple the hydrogen generator to the fuel cell, dramatically simplifying the design of a power generator. Control electronics may also be integrated or separate.

Figure 12:
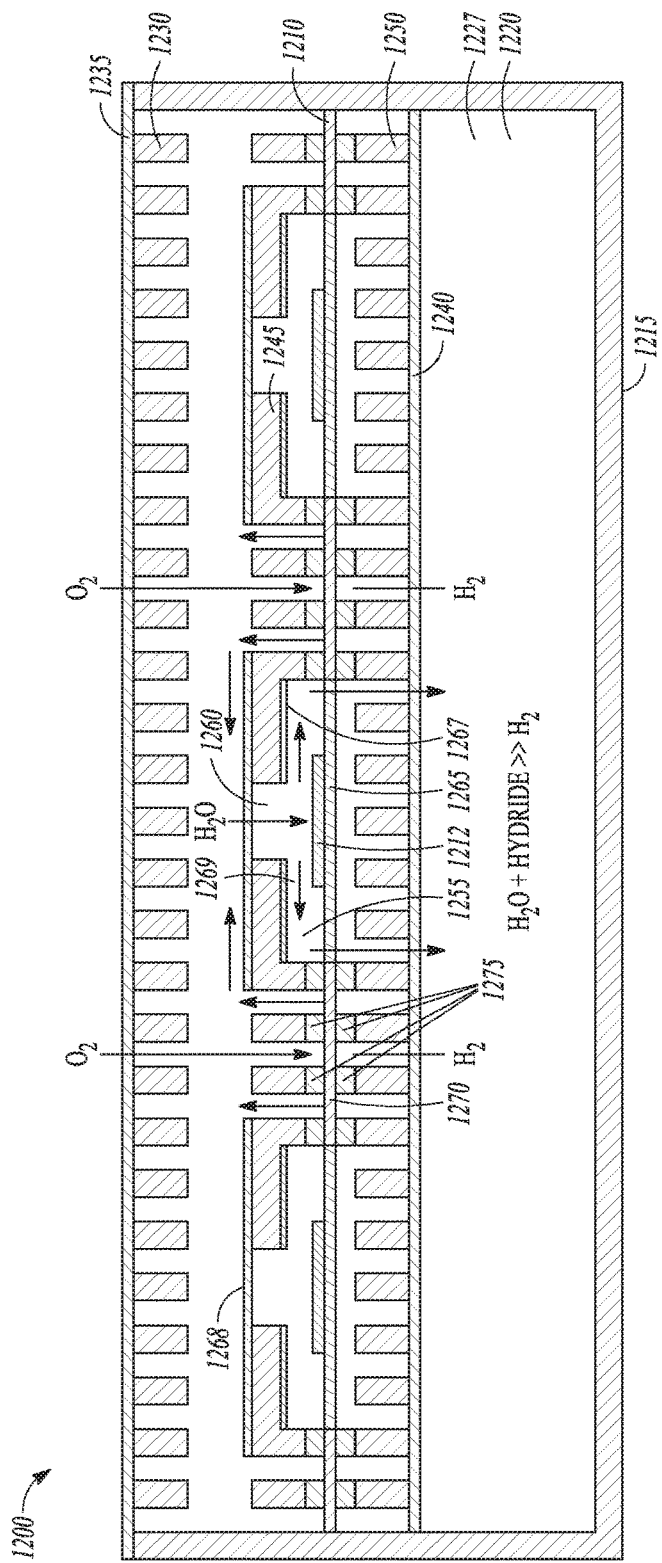
FIG. 12 is a cross section representation of a portion of an alternative power generator having an array of reference pressure chambers according to an example embodiment.

FIG. 12 is a block diagram of an alternative fuel cell based power generator 1200 utilizing a membrane 1210 based valve plate 1212 arrangement to control water vapor provided to fuel responsive to pressure. A power generator 1200 case 1215 has a chamber 1220 defined by a bottom side that holds hydrogen producing fuel 1227. A top side 1230 of case 1215 is permeable to gas and water vapor, and may also contain a liquid water impermeable membrane 1235. The top side 1230 may be perforated or otherwise permeable in various embodiments.

Membrane 1210 is disposed inside case 1215 between the top side 1230 and the fuel 1227, which may optionally have a particulate filter 1240 positioned to prevent migration of fuel toward membrane 1210. Membrane 1210 may extend laterally along a length of the chamber 1220 in one embodiment and is divided into different membrane portions. Membrane 1210 is sandwiched between two structural support layers 1245 and 1250 that provide different functions for different parts or portions of membrane 1210. Support layer 1250 is positioned between the membrane 1210 and fuel 1227 and is permeable to both water vapor and hydrogen. One portion of support layer 1245 forms a chamber 1255 with an opening 1260 that is exposed to water vapor migrating through top side 1230. A first membrane portion 1265 of the membrane 1210 is disposed within the chamber 1255 and includes the valve plate 1212 that moves with the membrane responsive to pressure to engage with the opening 1260 and prevent water vapor from passing to the fuel 1227 when the pressure in the fuel chamber 1220 is higher than ambient. A gasket 1267 may be disposed on layer 1245 about the opening 1260 to engage the valve plate 1212 as it moves to restrict water vapor flow through opening 1260.

In one embodiment, a reference pressure maintaining membrane 1268 is disposed between ambient and the membrane 1210, and is supported by support layer 1245, covering opening 1250, to help maintain a reference pressure in chamber 1255 in a manner the same as that in FIG. 1. Adhesive may be used in some embodiments to retain membrane 1268 to support layer 1245 and create an air impermeable seal between membrane 1268 and support layer 1245. As seen in FIG. 12, there may be multiple reference pressure chambers 1255, each created by separate reference pressure maintaining membranes 1268 for each of multiple valve plates 1212.

A second membrane portion 1270 of membrane 1210 is patterned with anode and cathode catalysts, and acts as a membrane electrode assembly fuel cell membrane. Second membrane portion 1270 may positioned between support layer 1245 in an area outside the chambers 1255, resulting in alternating first and second portions of the membrane 1210, along with corresponding reference chambers associated with the first portions of the membrane 1210. Current collectors 1275 are shown contacting the second membrane portion 1270 to act as anode and cathode contacts for the fuel cell membrane. The current collectors 1275 may be patterned as conductive traces. In some embodiments, multiple chambers 1255 with membrane portions containing valve plates and second membrane portions form an array of valves and fuel cell membranes along a length and width of the membrane 1210. In some embodiments, control electronics may also be integrated or separate.

Figure 13:
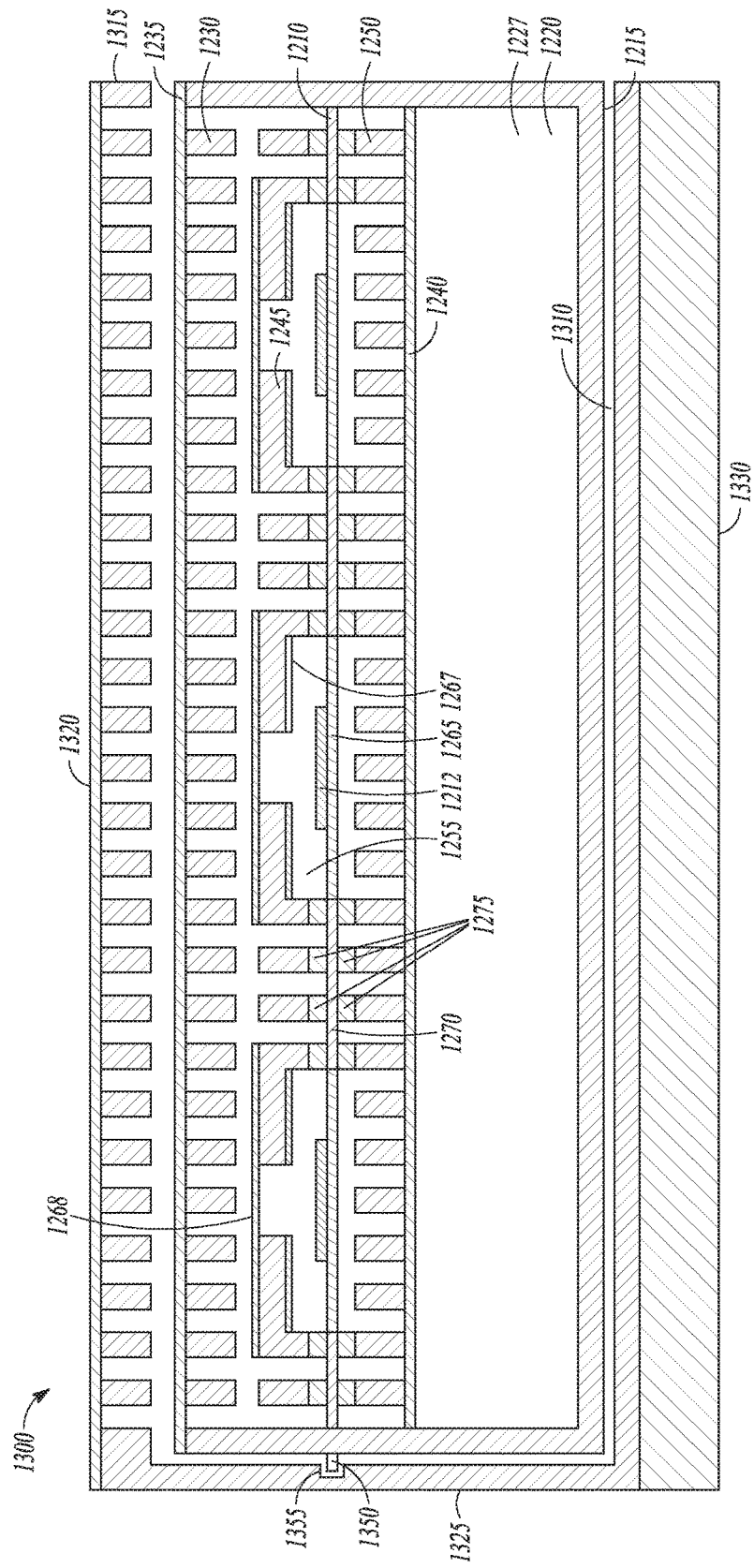
FIG. 13 is a cross section representation of a power generator container having a power generator inserted according to an example embodiment.

FIG. 13 is a block cross section of a power generator container 1300 having a replaceable power generator 1200 inserted into a power generator container cavity 1310, filling up the cavity in one embodiment. The power generator container 1300 contains a first side wall 1315 that is permeable to water vapor, and a gas permeable, liquid water impermeable membrane 1320 covering the wall to prevent particulates and liquid water from entering the generator 1200 and possibly reaching fuel 1227. In some embodiments, both membranes 1320 and 1235 may be used, or either one or both may be optional. Reference pressure maintaining membranes 1268 may also be used to maintain a reference pressure in chambers 1255. A back side 1325 is shown opposite an opening of cavity 1310, and provides a stop when sliding the power generator 1200 into the cavity 1310. No additional gas paths are needed in this embodiment, as power generator 1200 provides hydrogen directly to fuel cell 1270. In one embodiment, control electronics 1330 are provided as previously described to both couple to electrodes of fuel cell 1270 for power transfer and potential storage. Container 1300 may also contain conductors between the control electronics 1330 and a connector 1350 on the power generator 1200 that mates with a mating connector 1355 on the power generator container 1300 when the power generator 1200 is plugged into the cavity 1310.

Figure 14:
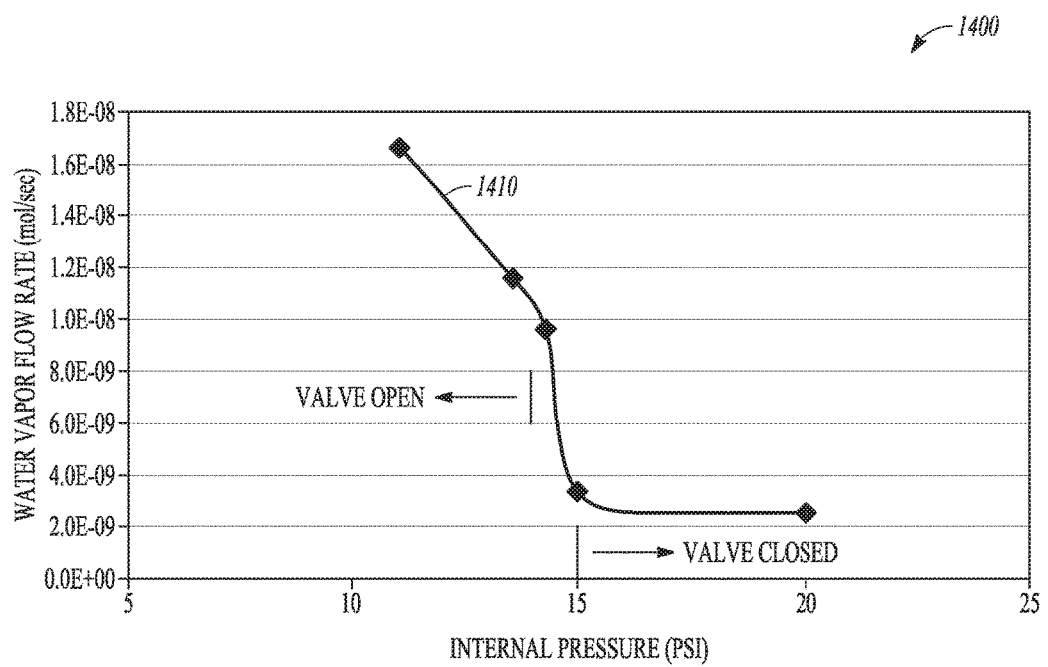
FIG. 14 is a graph illustrating water vapor flow rate versus internal pressure of a membrane based valve assembly according to an example embodiment.

FIG. 14 is a graph 1400 illustrating a proof of concept of a membrane with valve plate assembly according to an example embodiment. Water vapor flow rate in mol/second is shown on a y-axis, with internal pressure shown on an x-axis. A curve 1410 is annotated with the corresponding position of the valve. External pressure is atmospheric pressure, which appears to be just less than 15 psi. The valve appears to be open at a little less than 15 psi, and closed at 15 psi and greater. Note that some minimal flow still occurs when the valve is closed.

Figure 15:
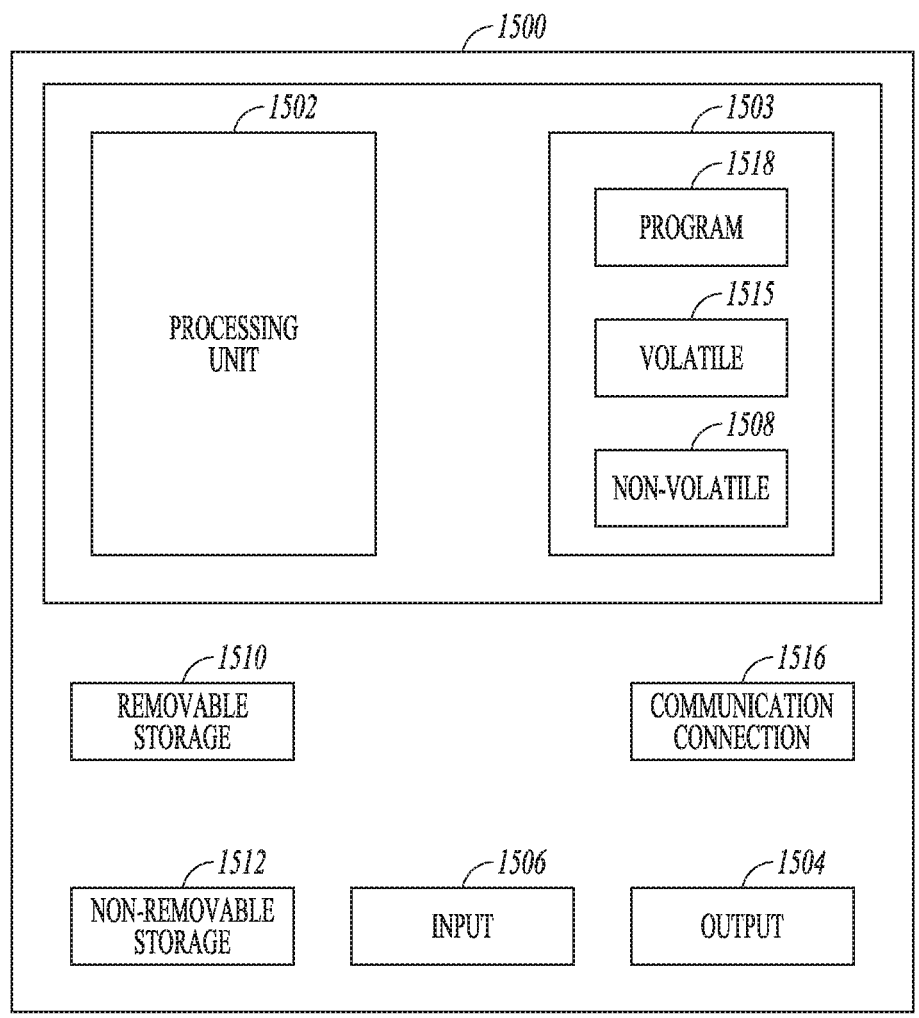
FIG. 15 is a block diagram of a computer system for implementing a controller according to an example embodiment.

FIG. 15 is a block schematic diagram of a computer system 1500 to implement control electronics according to an example embodiment. The computer system 1500 may also take the form of an integrated circuit or commercially available microprocessor or microcontroller having fewer components than shown in FIG. 15. One example computing device in the form of a computer 1500, may include a processing unit 1502, memory 1503, removable storage 1510, and non-removable storage 1512. Memory 1503 may include volatile memory 1514 and non-volatile memory 1508. Computer 1500 may include—or have access to a computing environment that includes—a variety of computer-readable media, such as volatile memory 1514 and non-volatile memory 1508, removable storage 1510 and non-removable storage 1512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1500 may include or have access to a computing environment that includes input 1506, output 1504, and a communication connection 1515. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1502 of the computer 1500. A hard drive. CD-ROM, and RAM are some examples of articles including a non-transitory computer-readable medium. For example, a computer program 1518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1500 to provide generic access controls in a COM based computer network system having multiple users and servers.

The following are sets of examples. Features from the various examples may be combined and interchanged in various embodiments.

1. A device comprising:

a case having a surface with a perforation and a first cavity containing a gas generating fuel;

a first membrane supported by the case inside the first cavity, the first membrane having an impermeable valve plate positioned proximate the perforation, wherein the first membrane is water vapor permeable and gas impermeable and flexes responsive to a difference in pressure between the cavity and outside the cavity to selectively allow water vapor to pass through the perforation to the fuel as a function of the difference in pressure; and a second membrane that is water vapor permeable gas impermeable coupled between an outside of the case exposed to ambient atmospheric gas and the valve plate creating a reference pressure second cavity configured to reduce the effects of ambient pressure transients on the difference in pressure.

2. The device of example 1 wherein the second membrane comprises a first perforated plate to reduce flexing of the second membrane responsive to ambient pressure transients.

3. The device of any of examples 1-2 wherein the second membrane is rigid.

4. The device of any of examples 1-3 and further comprising a fuel cell membrane supported by the case and positioned to receive hydrogen at an anode side of the fuel cell membrane and to receive oxygen from outside the power generator at a cathode side of the fuel cell membrane.

5. The device of any of examples 1-4 wherein the case further comprises a second perforated plate positioned between the first membrane and the first cavity containing the gas generating fuel.

6. The device of any of examples 1-5 wherein the second membrane comprises a sulfonated tetrafluoroethylene based fluoropolymer-copolymer layer.

7. The device of example 6 wherein the second membrane further comprises a first perforated plate coupled to the sulfonated tetrafluoroethylene based fluoropolymer-copolymer layer to reduce flexing of the second membrane responsive to ambient pressure transients.

8. The device of example 7 wherein the first perforated plate is adhered to the case to seal the second cavity from ambient gas.

9. The device of example 8 wherein the first perforated plate is adhered to the case by an adhesive.

10. The device of claim 9 wherein the first perforated plate is formed of plastic, ceramic, or metal.

11. The device of any of examples 6-10 wherein the sulfonated tetrafluoroethylene based fluoropolymer-copolymer layer is between approximately 1 um to 100 um thick.

12. The device of any of examples 1-11 and further comprising a water reactive hydrogen generating fuel disposed within the first cavity to receive water vapor passed through the first membrane.

13. A power generator comprising:
a case having a surface with an array of perforations and a first cavity containing a gas generating fuel;
a first membrane supported at a first side of the case inside the first cavity, the first membrane having an array of impermeable valve plates, each positioned proximate the perforations, wherein the first membrane is water vapor permeable and gas impermeable and flexes responsive to a difference in pressure between the cavity and outside the first cavity to selectively allow water vapor to pass through the perforations to the fuel as a function of the difference in pressure;
a fuel cell membrane supported to receive hydrogen at an anode side of the fuel cell membrane and to receive oxygen from outside the power generator at a cathode side of the fuel cell membrane; and
a second membrane that is water vapor permeable and gas impermeable, the second membrane disposed between ambient air and the first membrane and being rigid to create a second cavity having a reference pressure on a side of the first membrane opposite the first cavity.

14. The power generator of example 13 and further comprising:
a first particulate filter disposed between the first cavity and the first membrane; and
a second particulate filter disposed between the first cavity and the fuel cell membrane.

15. The power generator of any of examples 13-15 wherein the second membrane comprises an array of membranes, the second cavity comprises an array of second cavities and corresponding array of openings, and wherein the array of second cavities corresponds to the array of valve plates aligned with the array of openings, and wherein the fuel cell membrane is supported by areas of the first membrane not covered by the array of second cavities.

16. The power generator of example 15 wherein the first membrane is supported by the case at a perimeter of the first membrane such that water vapor can only travel through the first membrane to reach the cavity containing the gas generating fuel, including water vapor generated by the fuel cell membrane, and wherein the array of second membranes are supported about the openings of the array of second cavities, allowing water vapor to pass into the second cavities through the openings.

17. The power generator of any of examples 13-16 wherein the case further comprises a perforated plate positioned between the membrane and the cavity containing the gas generating fuel, wherein the gas generating fuel comprises a hydride fuel.

18. A method comprising:
passing water vapor through a gas impermeable, water vapor permeable first membrane to a gas producing fuel in a power generator;
maintaining a reference pressure in a reference pressure chamber;
responsive to a gas pressure in the container higher than pressure outside the power generator, moving a plate supported by the first membrane towards a perforation in the reference pressure chamber to impede passing of water vapor to the gas producing fuel;
responsive to a gas pressure in the power generator lower than the pressure in the reference pressure chamber, moving the first membrane and plate away from the perforation;
providing gas produced by the gas producing fuel reacting with the water vapor to a fuel cell membrane; and
providing oxygen to the fuel cell membrane to produce electricity.

19. The method of example 18 wherein the perforation comprises an array of perforations, the first membrane comprises an array of plates corresponding to the array of perforations, and the reference pressure chamber comprises an array of reference pressure chambers corresponding to the array of plates and perforations.

20. The method of example 19 wherein the fuel cell membrane comprises catalyst coated portions of the membrane, and wherein the reference pressure is maintained in the reference pressure chambers by an array of water vapor permeable, atmospheric gas impermeable second membranes.

The invention claimed is:

1. A device comprising:
a case having a surface with a perforation and a first cavity containing a gas generating fuel;
a first membrane supported by the case inside the first cavity, the first membrane having an impermeable valve plate positioned proximate the perforation, wherein the first membrane is water vapor permeable and other gas impermeable, and flexes responsive to a difference in pressure between the cavity and outside the cavity to selectively allow water vapor to pass through the perforation to the fuel as a function of the difference in pressure; and
a second membrane that is water vapor permeable and other gas impermeable, coupled between an outside of the case exposed to ambient atmospheric gas and the valve plate, to creating a reference pressure in a second cavity, configured to maintain the reference pressure in the second cavity.

2. The device of claim 1 wherein the second membrane comprises a first perforated plate.

3. The device of claim 1 wherein the second membrane is formed of a rigid material selected from plastic, ceramic, and metal, and wherein the second membrane is more rigid than the first membrane.

4. The device of claim 1 and further comprising a fuel cell membrane supported by the case and positioned to receive hydrogen at an anode side of the fuel cell membrane and to receive oxygen from outside the power generator at a cathode side of the fuel cell membrane.

5. The device of claim 1 wherein the case further comprises a second perforated plate positioned between the first membrane and the first cavity containing the gas generating fuel.

6. The device of claim 1 wherein the second membrane comprises a sulfonated tetrafluoroethylene based fluoropolymer-copolymer layer.

7. The device of claim 6 wherein the second membrane further comprises a first perforated plate coupled to the sulfonated tetrafluoroethylene based fluoropolymer-copolymer layer.

8. The device of claim 7 wherein the first perforated plate is adhered to the case to seal the second cavity from ambient gas.

9. The device of claim 8 wherein the first perforated plate is adhered to the case by an adhesive.

10. The device of claim 9 wherein the first perforated plate is formed of plastic, ceramic, or metal.

11. The device of claim 6 wherein the sulfonated tetrafluoroethylene based fluoropolymer-copolymer layer is between approximately 1 um to 100 um thick.

12. The device of claim 1, wherein the gas generating fuel comprises a water reactive hydrogen generating fuel to receive water vapor passed through the first membrane.

13. A power generator comprising:
a case having a surface with an array of perforations and a first cavity containing a gas generating fuel;
a first membrane supported at a first side of the case inside the first cavity, the first membrane having an array of impermeable valve plates, each positioned proximate the perforations, wherein the first membrane is water vapor permeable and other gas impermeable and flexes responsive to a difference in pressure between the cavity and outside the first cavity to selectively allow water vapor to pass through the perforations to the fuel as a function of the difference in pressure;
a fuel cell membrane supported to receive hydrogen at an anode side of the fuel cell membrane and to receive oxygen from outside the power generator at a cathode side of the fuel cell membrane; and
a second membrane that is water vapor permeable and other gas impermeable, the second membrane disposed between ambient air and the first membrane and being rigid to create a second cavity having a reference pressure on a side of the first membrane opposite the first cavity.

14. The power generator of claim 13 and further comprising:
a first particulate filter disposed between the first cavity and the first membrane; and
a second particulate filter disposed between the first cavity and the fuel cell membrane.

15. The power generator of claim 13 wherein the second membrane comprises an array of membranes, the second cavity comprises an array of second cavities and corresponding array of openings, and wherein the array of second cavities corresponds to the array of valve plates aligned with the array of openings, and wherein the fuel cell membrane is supported by areas of the first membrane not covered by the array of second cavities.

16. The power generator of claim 15 wherein the first membrane is supported by the case at a perimeter of the first membrane such that water vapor can only travel through the first membrane to reach the cavity containing the gas generating fuel, including water vapor generated by the fuel cell membrane, and wherein the array of second membranes are supported about the openings of the array of second cavities, allowing water vapor to pass into the second cavities through the openings.

17. The power generator of claim 13 wherein the case further comprises a perforated plate positioned between the membrane and the cavity containing the gas generating fuel, wherein the gas generating fuel comprises a hydride fuel.

18. A method comprising:
passing water vapor through a water vapor permeable and other gas impermeable first membrane to a gas producing fuel in a power generator;
maintaining a reference pressure in a reference pressure chamber;
responsive to a gas pressure in a container higher than pressure outside the power generator, moving a plate supported by the first membrane towards a perforation in the reference pressure chamber to impede passing of water vapor to the gas producing fuel;
responsive to a gas pressure in the power generator lower than the pressure in the reference pressure chamber, moving the first membrane and plate away from the perforation;
providing gas produced by the gas producing fuel reacting with the water vapor to a fuel cell membrane; and
providing oxygen to the fuel cell membrane to produce electricity.

19. The method of claim 18 wherein the perforation comprises an array of perforations, the first membrane comprises an array of plates corresponding to the array of perforations, and the reference pressure chamber comprises an array of reference pressure chambers corresponding to the array of plates and perforations.

20. The method of claim 19 wherein the fuel cell membrane comprises catalyst coated portions of the membrane, and wherein the reference pressure is maintained in the reference pressure chambers by an array of water vapor permeable and other atmospheric gas impermeable second membranes.

* * * * *